Figure 1:
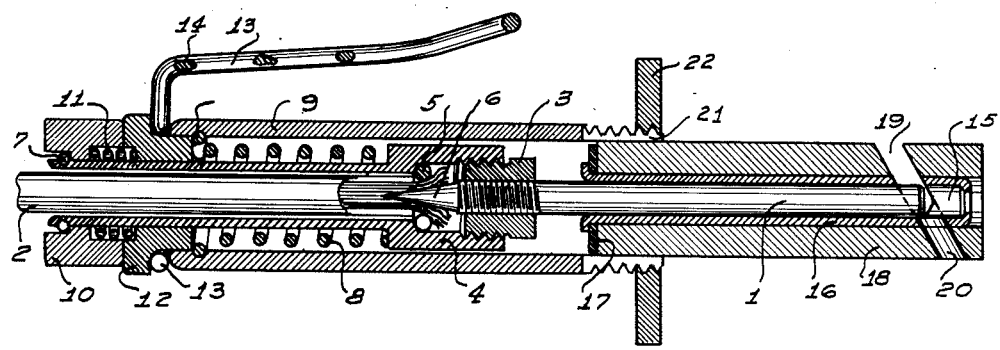
Figure 2:
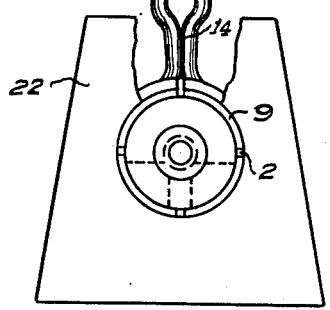
Figure 3:
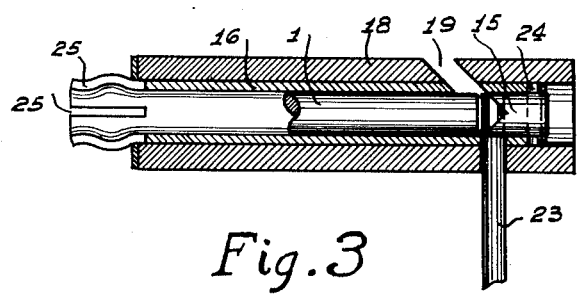
Figure 4:
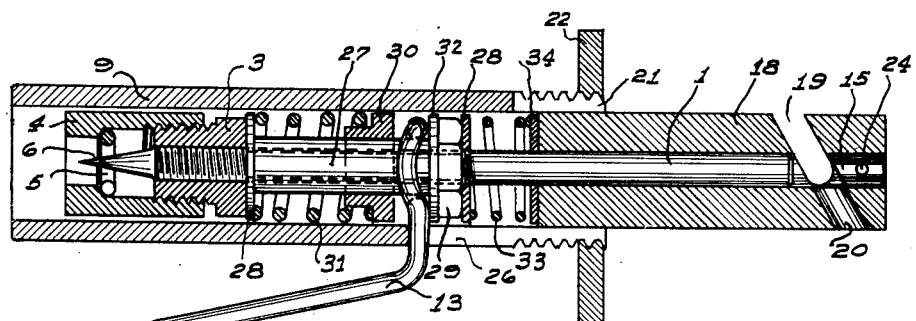
Figure 5:
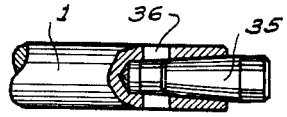

Nov. 10, 1936.  C. A. BOWLUS  2,060,606

ELECTRIC ARC WELDING ELECTRODE HOLDER

Filed April 29, 1935

Inventor
Claude A. Bowlus
By Stanley Lightfoot
ATTORNEY.

Patented Nov. 10, 1936

2,060,606

UNITED STATES PATENT OFFICE 2,060,606

ELECTRIC ARC WELDING ELECTRODE HOLDER.

Claude A. Bowlus, Birmingham, Mich.

Application April 29, 1935, Serial No. 18,733

5 Claims. (Cl. 219—8)

This invention relates to the electric arc welding art, and is intended to provide a cheap means of making an arc welding electrode holder that will provide sustained comfort to the operator; a greater degree of safety from flash and resultant injury to the eyesight; full protection from accidental electric shock; and enable the operator to produce more work by adding to his convenience and comfort while performing his duties.

My invention aims to fully insulate the clamping jaws in which the welding wire is held both electrically and thermally, so that only a small portion of the heat generated by the arc is conducted back to the hand of the operator. An additional advantage to be enjoyed with this particular electrode holder that will become evident lies in the fact that the outer clamping jaw can be rapidly disassembled and replaced. Another advantage is that the spring which holds the contact member carrying the electric current against the welding wire, is contained wholly in the holder and is fully protected against annealing by the heat from the arc. The lever employed to open the wire clamping members may be freely rotated about the handle as may be required by the operator and may be used readily in either the right or the left hand. The center of gravity of the holder is well back of the physical center, so that the major portion of the weight will lie in the hand of the operator and may be held with the axis horizontal with a minimum of physical effort. The tool is for all practical purposes, in balance about the major axis and provides against the objectionable tilting of the welding electrode away from the point at which the arc is being applied, and thereby saving a considerable expenditure of physical effort on the part of the operator.

One form of my arc welding electrode holder is illustrated in the accompanying drawing, in which Figure (1) is a vertical section of the entire device. Figure (2) is an end view of the same form of the device illustrated in Figure (1). Figure (3) is a vertical section of a renewable insulator, outer clamping jaw, and conductor tube assembly, which may be used interchangeably with a type of such assembly shown in Figure (1), and aims to provide a means of assuring continuous contact between the central conductor bar, and the tube in which the outer clamping jaw is held. Figure (4) is a vertical section of another type of electrode holder embodying the same general principles of construction of the device shown in Figure (1) with the exception of the action of the central conductor bar lifting lever, which is reversed in its action and the electrode would therefore be required to be held in place by manual pressure on said lever by the operator. Figure (5) is a vertical elevation of a portion of the central conductor bar common to Figures (1), (2), (3), and (4), and shows a special method of construction involving a renewable, wear resistant tip member.

Referring to Figure (1), the device consists essentially of a central conductor bar 1, chamfered at one end at which the electrode is intended to be clamped and provided at the opposite end with a point 6, intended to be inserted into the end of the conductor cable 2, and threaded back from the pointed end for a portion of its length to accommodate an internally threaded member 3, fitted to the central conductor bar over the threaded portion thereof, which serves to clamp said central conductor tightly to the cable by means of an external thread fitting to the internal thread of a tubular plunger 4, which generally is of tubular form and which is counterbored for a distance beyond the internal thread for the reception of a cable clamp ring 5, which fits loosely over the skinned end of the flexible, insulated cable 2, and is tightly expanded against the inner wall of member 4 by means of the pressure exerted radially by the thrust of the point 6 of the contact bar 1. The above mentioned tubular member 4 is machined for a portion of its length to a smaller outside diameter and is further provided with an annular groove near the end opposite the threaded end for the reception of a small ring 7 made of material of a circular cross section such as spring wire in an emergency replaceable with a small piece of welding wire for the purpose of holding other parts in assembled relation.

Seated against the shoulder of tubular plunger 4, is a spring 8, helical for the greater portion of this length and having at least one turn formed to a slightly greater diameter and adapted to fit into an annular groove formed on the inside of the handle 9, the said spring 8 thus maintaining said handle and said plunger in assembled relation. Upon detachment of said spring 8 from said handle, the plunger and parts associated therewith may be removed as a unit.

Secured on the tubular plunger 4, and detachably retained by the removable lock ring 7, is a knob 10 bored to accurately fit tubular member 4, and counterbored at the outer end to hold lock ring 7 firmly in place by confining same to a diameter of said counterbore. The other side of said knob 10, is also counterbored for the reception of a small helical spring 11, which in turn fits into a similar counterbore of knob 12, also provided with an internal bore which fits tubular member 4, and for a portion of its length, is reduced in diameter to accommodate the lever 13, and also extend into the end of the handle 9. The members 10 and 12 form a stop limiting the inward movement of the tubular member 4 within the handle 9.

The lever 13 is formed of a piece of metal of round cross section such as wire or drawn rod, bent double with a portion of its length closely abutting and held by a number of welds 14, and having the free ends again spread and formed into a circular loop to fit intimately about the small outer diameter of the knob 12, and abut normally against one end of the handle 9. Pressure on the outer end of said lever 13, sets up a reaction against the plain annular face perpendicular to the axis of knob 12, and the handle 9, which causes knob 12, knob 10, to be pushed away from the handle and therefore translates knob 12, spring 11, knob 10, lock ring 7, tubular member 4, clamp ring 5, clamp nut 3, and central conductor bar 1, longitudinally along the axis of the handle 9, and tubular member 16, to accommodate the welding wire between the end of the central conductor bar 1, and the clamping jaw 15. By releasing lever 13, a welding electrode can be held firmly between the end of the conductor bar 1, and clamping jaw 15. It will be noted that clamping jaw 15, is fitted in the end of a tubular member 16, spun inwardly at one end toward the axis to tightly retain clamping jaw 15, and spun outwardly at the opposite end to fit tightly against the washer 17. Over tubular member 16, is placed another tubular member 18, which is preferably made of an insulating, heat resistant and thermally insulating material such as asbestos.

It will be noted that tubular member 18 is provided with a lateral opening which registers with a lateral opening in tubular member 16, and is also provided with a hole, which forms another lateral opening which registers with another hole and therefore second lateral opening into tube 16. These lateral openings are provided for the purpose of accommodating the welding wire which is clamped at either an angle of 90° or any other angle that need be chosen, by fixing the angle of the lateral openings accordingly.

The outer diameter of tubular member 18 is chosen structurally to fit the inner diameter of the handle 9 which is povided with a multiplicity of slots 21, and threaded outside at one end to accommodate the clamp nut 22, which is made preferably of an insulating material such as fiber or asbestos filled cellulose acetate composition, and which is provided with a tapered thread. As the clamp nut 22, is screwed tightly on to the handle 9, the tapered thread of nut 22 clamps the slotted end of the handle tightly over the tubular member 18 and holds same tightly in functional relation with the other parts of the device. It will be evident that by loosening the nut 22, the entire assembly consisting of tubular member 18, tubular member 16, washer 17, and clamping jaw 15, can be readily removed for inspection, repair, or replacement. By pushing back the central conductor bar 1, into the handle 9, knob 10 can be also pushed along tubular member 4, lock ring 7 can be removed and the device can be easily disassembled.

Figure (2) shows the relation of the parts of Figure (1), and the end view of lever 13, further indicating the method in which it is formed of wire and held in relation by the welds 14.

Figure (3) shows a sectional elevation of a contact jaw assembly with the welding wire 23 inserted through a lateral opening at an angle so chosen that one end of the welding wire 23 can be inserted only partly through tubular member 16. Figure (3) also shows another method of assembling clamping jaw 15 to tubular member 16, by means of a pin 24, inserted through a hole passing transversely through the walls of tubular member 16, and registering with a similar hole in clamping jaw 15. Also a provision is made in tubular member 16, by a multiplicity of slots 25, for bending the free ends of said tubular member 16 inwardly to provide for the maintenance of a continuous contact between central conductor bar 1 and tubular member 16 so that the conductivity of tubular member 16 and conductor bar 1 may be made wholly available to carry the electric current to the welding rod 23.

Figure (4) is a vertical elevation of another type of electrode holder in which the conductor bar 1 is normally held out of contact with the welding electrode and is translated axially in the handle by pressure of the hand of the operator on the lever 13. The lever 13 passes through an enlarged slot 26, in the handle 9, loops around the central conductor bar 1, is insulated from same by a tubular insulating member 27, and a pair of insulating washers 28 and 32. The central conductor bar 1, is threaded for a portion of its length and over the threads is fitted a clamp nut 29 and also clamp nut 3. Sliding on the insulating member 27, is a bushing 30, which seats against the loop of the handle 13, and is held continuously in that relation by a spring 31, which is insulated from clamp nut 3 by washer 28. Handle 13 is also insulated by washer 32 from clamp nut 29. On the opposite side of the clamp nut 29, is another insulating washer which serves as a seat for spring 33, which in turn seats at the opposite end against insulating washer 34, which seats against insulating tube 18. Referring further to Figure (4), it will be evident that if tube 18 is made of insulating material that normally the conductor bar 1, is not exposed and would not touch a straight length of welding wire which might be inserted into lateral openings 19 or 20, and therefore if the operator loosens his grip on lever 13, and handle 9, the central electrode member 1, would move away from contact with the welding wire and the entire device could be laid down on the work bench or dropped on the floor without serious danger of flashing the operators or other workmen in the vicinity.

Referring to Figure (5), the central conductor bar is shown in part with a broken away section showing provision for a renewable tip 1, which has a tapered end inserted into a corresponding tapered socket formed preferably by drilling and reaming the end of conductor bar 1. An elongated hole 36, is provided for the insertion of a drift to facilitate removal of tip 35. The construction disclosed in Figure (5) provides means of readily, cheaply, and quickly renewing the surfaces subject to severe wear.

What I claim is:—

1. In a device of the class described, in combination, a tubular handle member, a tubular plunger axially movable therein, a cable passing through said plunger, a conductor carried by said plunger, and coupled therewithin to said cable, a stop limiting forward movement of said plunger in said handle member, and a compression spring in said handle member urging said plunger forwardly, said spring engaging said plunger and said handle member to maintain them in assembled relation.

2. In a device of the class described, in combination, a tubular handle member, a tubular plunger axially movable therein, a cable, a conductor secured to said cable in said plunger, a removable stop limiting forward movement of said plunger in said handle member, and a compression spring in said handle member urging said plunger forwardly, said spring engaging said handle and said plunger to maintain them in assembled relation and said spring being detachable from said handle upon removal of said stop.

3. In a device of the class described, a tubular handle member, a conductor-carrying plunger axially movable therein, a spring urging said plunger forwardly in said handle member, a stop limiting such forward movement of said plunger, and a plunger-retracting lever engaged between said stop and said handle member.

4. In a device of the class described, a tubular handle member, a conductor-carrying plunger axially movable therein, a spring urging said plunger forwardly in said handle member, a stop limiting such forward movement of said plunger, and a plunger-retracting lever rotatably engaged between said stop and said handle member.

5. In a device of the class described, a tubular handle member, a conductor-carrying plunger axially movable therein, a spring urging said plunger forwardly in said handle member, said spring maintaining said handle and said plunger in assembled relation, a stop limiting forward movement of said plunger and normally concealing said spring in said handle, and a plunger-retracting lever engaged between said stop and said handle member, said stop being removable from said plunger to permit detachment of said lever and removal of said spring from said handle member.

CLAUDE A. BOWLUS.